(12) United States Patent
Shoji

(10) Patent No.: US 6,181,100 B1
(45) Date of Patent: Jan. 30, 2001

(54) POWER SUPPLY APPARATUS FOR CHARGING AND DISCHARGING BATTERY WITH HIGH ENERGY EFFICIENCY

(75) Inventor: Hideki Shoji, Iwaki (JP)

(73) Assignee: Toyo System Co., Ltd., Fukushima (JP)

( * ) Notice: Under 35 U.S.C. 154(b), the term of this patent shall be extended for 0 days.

(21) Appl. No.: 09/351,355

(22) Filed: Jul. 12, 1999

(51) Int. Cl.[7] .................................................. H01M 10/46
(52) U.S. Cl. .......................................................... 320/103
(58) Field of Search .................................. 320/103, 116, 320/118, 123, 140

(56) References Cited

U.S. PATENT DOCUMENTS

| | | | |
|---|---|---|---|
| 5,254,929 | * 10/1993 | Yang | 320/103 |
| 5,352,966 | * 10/1994 | Irons | 320/103 |
| 5,568,038 | * 10/1996 | Tatsumi | 320/103 |
| 5,668,463 | * 9/1997 | Duley | 320/103 |
| 5,896,022 | * 4/1999 | Jacobs, Sr. | 320/103 |

* cited by examiner

Primary Examiner—Edward H. Tso
(74) Attorney, Agent, or Firm—Muramatsu & Associates

(57) ABSTRACT

A battery charge/discharge power supply apparatus for saving electric energy when performing charge/discharge operation of a storage battery. The power supply apparatus includes a direct current power source for switchably connected to the storage battery, an auxiliary battery switchably connected to the storage battery, and a converter provided between the storage battery and the auxiliary battery. The storage battery is charged by the power supplied from the auxiliary battery in the charge cycle of the storage battery. The auxiliary battery is charged by the discharge power from the storage battery in the discharge cycle of the storage battery. The direct current power source replenishes shortage of a power capacity in the auxiliary battery.

8 Claims, 2 Drawing Sheets

POWER SUPPLY APPARATUS FOR CHARGING AND DISCHARGING BATTERY WITH HIGH ENERGY EFFICIENCY

FIELD OF THE INVENTION

This invention relates to a battery charge/discharge power supply apparatus for charging and/or discharging storage batteries, and more specifically, to a battery charge/discharge power supply apparatus which can reuse the electric power discharged from a storage battery for recharging the same or a different battery.

BACKGROUND OF THE INVENTION

In recent years, owing to the rapid increase in portable devices and the development of electric automobiles, the demand for storage (secondary) batteries is greatly increasing. Storage batteries are produced by assembling the electrode made of active materials in a discharged condition. Before shipping the storage batteries in the market, the batteries must be charged with electricity or activated by repeatedly charging and discharging the same. It is also necessary to test samples of storage batteries to determine whether the batteries satisfy the intended performances such as cycle life by repeating charge/discharge operations.

This invention is directed to a power supply apparatus to be used for such purposes by charging and/or discharging storage (secondary) batteries. In the conventional technology, when charging a battery, a DC (direct current) power source converted from an AC (alternating current) source, i.e., the commercial power source is used. When discharging the battery, a discharge load is used, which is typically a resistor or an electric load. In the conventional technology noted above, the electric energy stored in the storage battery is consumed by the discharge load. As a result, a large amount of electric energy is wasted. For this reason, the conventional method is disadvantageous.

Under the circumstances, as disclosed in Japanese Laid Open Patent Publication Nos. 2-261020 and 7-222369, there has been an attempt to effectively use the energy discharged from a storage battery. In the above patent publications, it is disclosed that the energy discharged from the storage battery is recycled by feed-backing the discharged energy to an AC power source so that the AC power is converted again to a DC power to charge the storage battery.

However, since these methods convert the DC power discharged by the storage battery into the AC power by using an inverter, it is difficult to obtain an AC power with normal sine waves. In other words, the AC power inverted from the DC power involves noise and distortion. In order to obtain an AC power source having normal sine waves, i.e., low distortion or noise in the wave form, a high quality control circuit must be used, resulting in the increase of the overall cost of the apparatus.

In such a case, in order to achieve the energy saving or recycling with a simplified control circuit of relatively low cost, the recycled AC electric power tends to involve a significant amount of signal distortion or high voltage impulse (instantaneous) noise. Therefore, such a less expensive method may not be applied to noise sensitive electric apparatuses, such as computers or automatic machines which require high quality electric power. Such being the case, the method of using the recycled AC electric power is not appropriate.

SUMMARY OF THE INVENTION

Therefore, it is an object of the present invention to solve the above noted problems and to provide a battery charge/discharge power supply apparatus which can effectively recycle the electric energy discharged from a storage battery for achieving an energy saving.

It is another object of the present invention to provide a battery charge/discharge power supply apparatus which does not cause any noise or wave form distortion in the alternating current (AC) power source.

It is a further object of the present invention to provide a battery charge/discharge power supply apparatus which can accurately monitor and control the charge/discharge performance of a battery under test as well as an auxiliary battery in the apparatus.

In the battery charge/discharge power supply apparatus of the present invention, an auxiliary storage battery and a power converter are provided in the power supply apparatus to store the discharged energy. The battery charge/discharge power supply apparatus for performing a charge/discharge operation on a storage battery includes a direct current (DC) power source switchably connected to a storage battery, an auxiliary battery switchably connected to the storage battery, and a converter provided between the storage battery and the auxiliary battery, wherein the storage battery is charged with the electric power supplied from the auxiliary battery through the converter in a charge cycle of the storage battery and the auxiliary battery is charged with the electric power discharged from the storage battery through the converter in a discharge cycle of the storage battery.

In this arrangement of the present invention, the power discharged by the storage battery is stored in the auxiliary battery through the converter. In the charge cycle of the storage battery, the power stored in the auxiliary battery is used to charge the storage battery through the converter, thereby recycling the electric energy.

In order to effectively utilize the auxiliary battery and maintain its initial performance for a long period of time, the charge and discharge performances of the batteries are monitored and controlled. For example, it is monitored and controlled as to whether the electric power discharged by the storage battery is appropriately supplied to the auxiliary battery and/or discharge load. Under the control as described above, the storage battery is charged with the discharged electricity of the auxiliary battery and/or the direct current of the DC power source. Also, the auxiliary battery is charged with the discharged electricity of the storage battery and/or the electricity supplied from the direct current source.

The charge and discharge conditions of the storage battery and the auxiliary battery are controlled by measuring the electric current and voltage of the batteries by the current/voltage measuring unit connected to each battery and comparing these measured values and the predetermined values. The comparison operation is performed by a controller such as a micro-computer. Based on the result of the comparison operation, switching between the input-output routes of the converter, switching between the direct current source and the discharge load, and switching of an electric charge source to the auxiliary battery are respectively controlled.

As the auxiliary battery in the power supply apparatus of the present invention, a lead storage battery, Ni—Cd (nickel cadmium) storage battery, Ni—MH (nickel metal-hydride) storage battery or Li-ion (lithium ion) storage battery may be used. Considering the function of the converter, the same kind of batteries should be used for both the storage battery and the auxiliary storage battery. The converter is typically a DC-DC converter which adjusts the voltage difference between the storage battery and the auxiliary battery. The converter also functions as a buffer for transferring the electric power from one battery to the other.

The capacity of the auxiliary battery may be freely determined. However, if the depth of discharge is increased to more than 80%, the durability of the auxiliary battery is greatly deteriorated and eventually the battery's life will end. Therefore, the depth of discharge in the auxiliary battery should be maintained 80% or less, preferably in the range from 25% to 50%.

The battery charge/discharge power supply apparatus as described above functions in such a way that the storage battery to be activated or tested is charged with electric energy which is stored in the auxiliary battery, and the auxiliary battery is charged with the electric energy of the storage battery which had been charged with the electricity discharged by the auxiliary battery. By this energy recycling in the battery charge/discharge power supply apparatus of the present invention, a large amount of energy saving can be achieved.

DETAILED DESCRIPTION OF THE EMBODIMENTS

Figure 1:
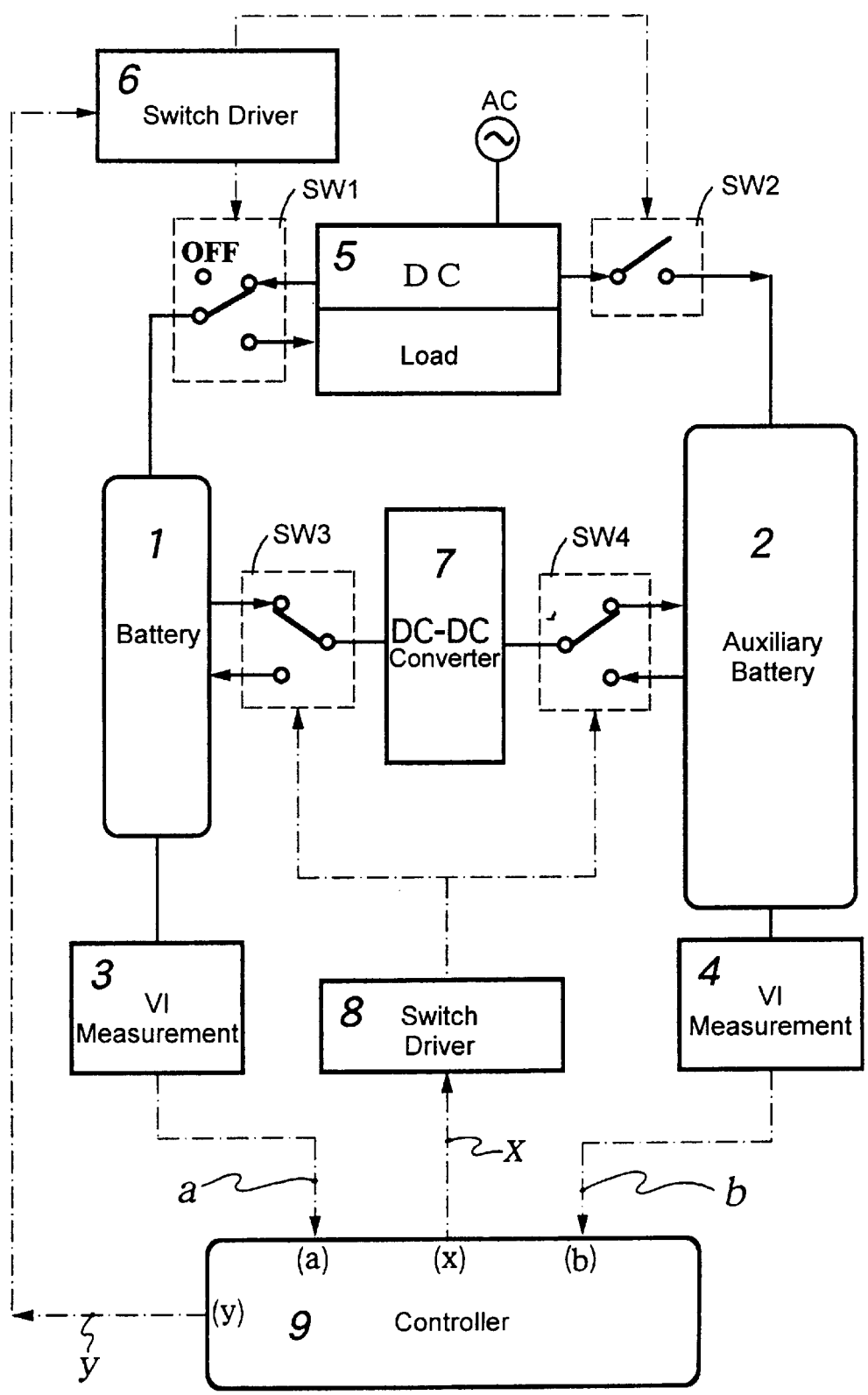
FIG. 1 is a block diagram of the battery charge/discharge power supply apparatus showing an embodiment of the present invention.

Referring now to the drawings, the embodiment of the present invention is explained as follows:

FIG. 1 is a block diagram of the battery charge/discharge power supply apparatus of the present invention. As noted above, charge and discharge processes must be performed on the storage batteries for the purposes of activating or testing the performance of the storage batteries. In FIG. 1, a storage battery 1 is a particular battery that is to be activated or tested by the power supply apparatus of the present invention.

In the example of FIG. 1, the battery charge/discharge power supply apparatus is formed of an auxiliary battery 2, voltage and current (VI) measurement units 3 and 4, a DC power source/discharge load 5, switch controllers 6 and 8, a converter 7, a controller 9 and switches SW1-SW4. An AC power source is connected to the DC power source/discharge load 5 to produced the DC voltage. In this specification, the DC power source/discharge load 5 may alternatively be called as a DC power source 5 when used as a power source and a discharge load when used as a load.

The auxiliary battery 2 is a storage battery which is charged with the electric current discharged from the storage battery 1 through the converter 7 in the discharge cycle of the battery 1. Conversely, the auxiliary battery 2 supplies the charged electricity to the storage battery 1 in the charge cycle of the battery 1.

The voltage and current (VI) measurement unit 3 is an electronic circuit or instrument for measuring the voltage and current of the storage battery 1 to monitor the charge/discharge condition thereof. Similarly, the current voltage measuring unit 4 is a circuit or instrument for measuring the current and voltage of the auxiliary battery 2 to monitor the charge/discharge condition thereof.

As noted above, the DC power source/discharge load 5 includes a DC power supply for supplying the DC current converted from the external AC power source such as the commercial power source to the storage battery 1 and the auxiliary battery 2. The DC power source/discharge load 5 also includes a discharge load which is typically a resistor for discharging the battery 1.

The switch driver 6 is to drive switches SW1 and SW2 based on the control signal from the micro-computer 9. The switch driver 6 and switches SW1 and SW2 operate to change the connection between the DC power source/discharge load 5 and the storage battery 1 as well as the connection between the DC power source/discharge load 5 and the auxiliary battery 2.

The converter 7 is provided between the storage battery 1 and the auxiliary battery 2. Typically, the converter 7 is a DC-DC converter. As is well known in the art, a DC-DC converter converts an input DC voltage to an output DC voltage with isolation therebetween. The input voltage may be either up-converted or down-converted to produce an output voltage by means of a high speed switching technology. In the present invention, the DC—DC converter 7 functions to adjust the voltage difference between the storage battery 1 and the auxiliary battery 2. The converter 7 also functions as a buffer for transferring the power from one battery to the other. The input/output direction of the converter 7 is switched by the switch driver 8 and switches SW3 and SW4 by the control signal from the micro-computer 9.

The micro-computer 9 receives the measured value a of the storage battery 1 from the voltage and current measurement unit 3 and the measured value b of the auxiliary battery 2 from the voltage and current measurement unit 4. The micro-computer 9 compares the measured values a and b with the predetermined values stored in the memory which represent the charge and discharge conditions. Based on the comparison, the micro-computer 9 outputs a control signal x to the switch driver 8 and a control signal y to the switch driver 6.

An example of operation and control procedure of the battery charge/discharge power supply apparatus of the present invention is explained in the following in which a storage battery to be tested is repeatedly provided with charge and discharge cycles.

CHARGE PROCESS OF BATTERY TO BE TESTED

The charge process of the battery 1 is started by supplying thereto the DC current from the auxiliary battery 2 through the converter 7 and from the DC power source 5. If the auxiliary battery 2 has an enough power charged therein, the battery 1 is charged solely by the auxiliary battery 2 through the converter 7. However, in the case where the auxiliary battery 2 has not sufficient electric charge therein, the supply of electric power to the battery 1 is supplemented by the DC current from the DC power source 5 in parallel or alternately. The procedure of charging the battery 1 is performed by controlling the switch driver 6 and the switch SW1 for the DC power source 5 and the switch driver 8 and the switches SW3 and SW4 for the auxiliary battery 2 based on the control signals x and y from the micro-computer 9.

The converter 7 increases or decreases the voltage of the auxiliary battery 2 to be appropriate to charge the battery 1. The discharge condition of the auxiliary battery 2 is monitored by the voltage and current measurement unit 4. The charge condition of the battery 1 under test is monitored by the voltage and current measurement unit 3.

When the micro-computer 9 detects that the discharge condition of the auxiliary battery 2 reached the predetermined stop point, the supply of power from the auxiliary battery 2 to the battery 1 is suspended by sending the control signal to the switch driver 8. At the same time, the microcomputer 9 sends the control signal to the switch driver 6 to connect the output of the DC power source 5 to the battery 1 via the switch SW1.

Generally, if the depth of discharge of the auxiliary battery 2 reaches more than 80% of the rated power capacity, durability of the battery is greatly deteriorated, causing problems to the battery for further use. Therefore, the depth of discharge of the auxiliary battery 2 should be maintained 80% or less, preferably from 25% to 50%. For that reason, auxiliary battery 2 may also be charged by the current from the DC power source 5 so that the charge and discharge performance of the auxiliary battery 2 is maintained for a long period of time.

DISCHARGE PROCESS OF BATTERY TO BE TESTED

At the start of the discharge process of the battery 1 under test, the DC power source 5 is disconnected (if it is connected in the charge process above) by changing the SW1 by the switching driver 6. At the same time, switch driver 8 drives the switches SW3 and SW4 so that the electric power is supplied from the battery 1 to the auxiliary battery 2 through the converter 7. The converter 7 adjusts the voltage difference between the battery 1 under test and the auxiliary battery 2. By this process, the discharged electric power from the battery 1 charges the auxiliary battery 2.

The charge condition of the auxiliary battery 2 is monitored by the voltage and current measurement unit 4 and the micro-computer 9. The discharge condition of the battery 1 under test is monitored by the voltage and current measurement unit 3 and the micro-computer 9. If the microcomputer 9 detects that the auxiliary battery 2 has reached the predetermined charge stop point, it provides a control signal to the switch driver 8 to suspend the supply of power from the battery 1 to the auxiliary battery 2. In this situation, the discharged power from the battery 1 may be consumed by the discharge load 5.

The discharged electric power from the battery 1 may be selectively or proportionally supplied to the auxiliary battery 2 and the discharge load 5, respectively. The microcomputer 9 monitors the condition of the auxiliary battery 2 based on the voltage and current values measured by measurement unit 4 and controls the level of charge to the auxiliary battery 2. Thus, the optimum charge condition for the auxiliary battery 2 is maintained, thereby achieving a sufficient life time of the auxiliary battery 2, i.e., the power supply apparatus. The micro-computer 9 also monitors the voltage and current for the battery 1 under test to determine the discharge level of the battery 1.

According to the operation of the battery charge/discharge power supply of the present invention for testing a storage battery, it becomes possible to save a large amount of electric energy which is approximately equal to that of electric energy used for charging the auxiliary battery 2. Therefore, the capacity of the auxiliary battery 2 is preferably larger than the capacity of the battery 1. Also, since the charge and discharge is conducted between the battery 1 and the auxiliary battery 2, it is preferable that the electro motive force of the battery 1 under test and the auxiliary battery 2 are approximately the same.

EXPERIMENTAL RESULTS

Figure 2:
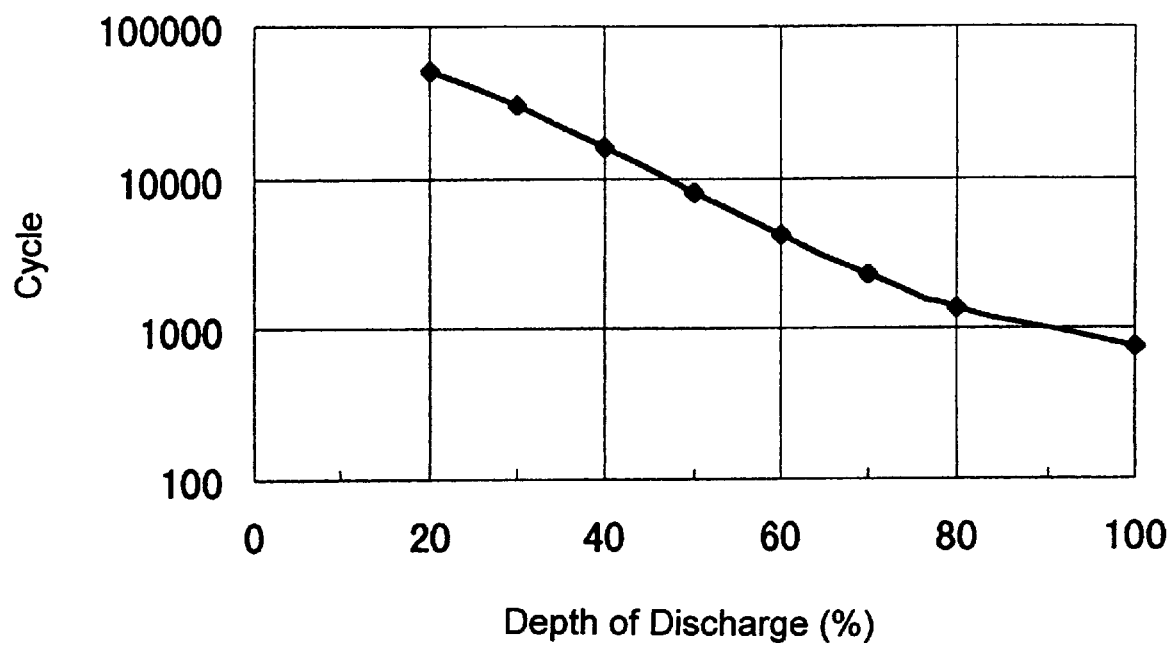
FIG. 2 is a graph showing a relationship between the number of charge/discharge cycles and the depth of discharge in the AA type Ni—Cd battery.

FIG. 2 is a graph showing the results of cycle life test of AA Ni—Cd batteries using the battery charge/discharge power supply of the present invention. In the example of FIG. 2, there is shown a relationship between the depth of discharge and the number of charge/discharge cycles when the life of the battery under test ends.

The rated capacity of each battery under test is 700mAH. The test was conducted by repeating the charge and discharge cycles of predetermined levels. In the charge cycle, the battery under test is charged by a rated current (1 C), i.e, 0.7 A to reach the voltage which is 10 mV less than the maximum voltage. In the discharge cycle, the battery under test is discharged by the rated current (1 C) to the battery output voltage of 1 V for the depth of discharge 100%. For the depth of discharge other than 100%, the battery under test is discharged by the rated current (1 C) until the discharged power reaches the percentage depth of discharge. Thus, in the above example, for the depth of discharge 80%, for example, the battery under test is discharged until it discharges 80% of the rated capacity, i.e., 560 mAH.

Further, in this experiment, it is defined that the life of the battery under test ends when the capacity is decreased to 60% of the rated capacity for the depth of discharge 100%. For the other percentage depth of discharge, the battery under test is determined dead when the capacity is decreased to that percentage of the rated capacity.

As seen in the graph of FIG. 2, it is known that the cycle life of the storage batteries is largely dependent upon the depth of discharge. Thus, In the practical use, the depth of discharge of the auxiliary battery 2 should be maintained less than 80%. Also, it is preferable that the capacity of the auxiliary battery 2 is 2–4 times larger than that of the battery 1 to be tested.

The power saving effect of the present invention is also tested as follows. A 4/3A Ni—MH battery of 3000 mAH is used as the auxiliary battery 2 for each channel of battery charge/discharge power supply apparatus having twelve supply channels. The power battery charge/discharge power supply apparatus includes the converter 7 which up-converts the incoming voltage to two times.

The cycle life test is performed for an AA Ni—MH battery of 1200 mAH by both the conventional apparatus and the apparatus of the present invention. The battery under test is charged by 120 mA until the voltage reaches 10 mV less than the peak value and is discharge by 120 mA until the voltage decreases to 1V. As a result of the cycle life test, the total power of 27 KWH is consumed during the test performed by the conventional apparatus. In contrast, with the use of the power supply apparatus of the present invention, the overall consumed power is 13 KWH.

The battery charge/discharge power supply of the present invention can be used as a charge/discharge test apparatus for evaluating the performance of newly produced batteries before delivery to customers. A plurality of batteries can be tested at the same time by the power supply apparatus of the present invention which may use one auxiliary battery. In such an arrangement, each of the batteries under test is independently controlled by the micro-computer.

According to the battery charge/discharge power supply apparatus of the present invention, the discharged electric power from the storage battery is stored in the auxiliary battery. The stored power in the auxiliary battery is used for charging the storage battery again or other battery. Thus, the external DC source is necessary only when replenishing the capacity shortage of the auxiliary battery. Accordingly, the overall consumption of electric power of the AC electric source can be substantially reduced. In addition, since the discharge load is used only when the auxiliary battery is charged in full, the loss of energy can be greatly reduced and energy can be effectively saved.

Since the electric energy stored in the battery is converted to the AC electric source, deteriorating effects against the surrounding machines, such as noise, are not caused. Further, by appropriately choosing the kind or capacity of the auxiliary battery and controlling the charge/discharge condition of the auxiliary battery, the durability of the auxiliary battery will be greatly enhanced thereby significantly lowering the running cost of the power supply apparatus.

Especially, by using the battery charge/discharge power supply apparatus of the present invention as a test tool for charging and discharging the battery under test, the consumption of electricity can be greatly reduced.

Although only a preferred embodiment is specifically illustrated and described herein, it will be appreciated that many modifications and variations of the present invention are possible in light of the above teachings and within the purview of the appended claims without departing the spirit and intended scope of the invention.

What is claimed is:

1. A battery charge/discharge power supply apparatus for performing a charge/discharge operation on a storage battery, comprising:

a direct current power source switchably connected to the storage battery to function as a power source and a discharge load;

an auxiliary battery switchably connected to the storage battery; and a DC-DC converter provided between the storage battery and the auxiliary battery for adjusting voltages between the storage battery and the auxiliary battery and promoting the charge/discharge operation;

wherein the storage battery is charged with an electric power discharged from the auxiliary battery through the converter in a charge cycle of the storage battery, and the auxiliary battery is charge by an electric power discharged from the storage battery through the converter in a discharge cycle of the storage battery, and the direct current power source replenishes shortage of a power capacity in the auxiliary battery; and wherein the discharged electric power from the storage battery is supplied to the auxiliary battery and the storage battery is charged by the discharged electric power from the auxiliary battery in response to charge/discharge conditions including a depth of discharge of the storage battery and the auxiliary battery.

2. A battery charge/discharge power supply apparatus as defined in claim 1, wherein the discharged electric power from the storage battery is supplied to the auxiliary battery and the discharge load in response to charge/discharge conditions including the depth of discharge of the storage battery and the auxiliary battery.

3. A battery charge/discharge power supply apparatus as defined in claim 1, wherein the storage battery is charged by the discharged electric power from the auxiliary battery and the direct current power source in parallel or alternately in response to charge/discharge conditions including the depth of discharge of the storage battery and the auxiliary battery.

4. A battery charge/discharge power supply apparatus as defined in claim 1, wherein the DC-DC converter converts a voltage level to adjust the voltage difference between the storage battery and the auxiliary battery and defines a direction of current flow in the charge/discharge operation by function as a buffer between the storage battery and the auxiliary battery.

5. A battery charge/discharge power supply apparatus as defined in claim 1, further comprising a voltage and current measurement unit for measuring voltages and currents of the storage battery and the auxiliary battery, and a micro-computer for controlling an overall operation of the power supply apparatus based on voltage and current data measured by the voltage and current measurement unit.

6. A battery charge/discharge power supply apparatus as defined in claim 1, further comprising a voltage and current measurement unit for measuring voltages and currents of the storage battery and the auxiliary battery, a micro-computer for controlling an overall operation of the power supply apparatus based on voltage and current data measured by the voltage and current measurement unit, a means for switching between the direct current power source and the storage battery and between the direct current power source and the auxiliary battery in response to a control signal from the micro-computer, and a means for changing the direction of the converter between the storage battery and the auxiliary battery in response to a control signal from the microcomputer.

7. A battery charge/discharge power supply apparatus as defined in claim 1, wherein a depth of discharge in the auxiliary battery is maintained to be less than 80% of a rated capacity of the auxiliary battery.

8. A battery charge/discharge power supply apparatus as defined in claim 1, wherein a depth of discharge in the auxiliary battery is maintained to be about 25–50% of a rated capacity of the auxiliary battery.

* * * * *